United States Patent [19]

Shinomiya

[11] Patent Number: 5,202,779
[45] Date of Patent: Apr. 13, 1993

[54] FERROELECTRIC LIQUID CRYSTAL DISPLAY DEVICE WITH POLYIMIDE ORIENTATION FILM OF BIS(4-AMINOCYCLOHEXYL) METHANE AND AROMATIC TETRACARBOXYLIC ACID ANHYDRIDE

[75] Inventor: Tokihiko Shinomiya, Nara, Japan

[73] Assignee: Sharp Kabushiki Kaisha, Osaka, Japan

[21] Appl. No.: 527,960

[22] Filed: May 24, 1990

[30] Foreign Application Priority Data

May 26, 1989 [JP] Japan ................... 1-133740

[51] Int. Cl.$^5$ ................. G02F 1/1337; C09K 19/00
[52] U.S. Cl. .................................. 359/78; 428/1
[58] Field of Search ............ 350/340, 341, 339 R; 359/78; 428/1

[56] References Cited

U.S. PATENT DOCUMENTS

| | | | |
|---|---|---|---|
| 4,405,208 | 9/1983 | Shirai | 350/341 |
| 4,494,824 | 1/1985 | Nakamura et al. | 350/339 R |
| 4,593,977 | 6/1986 | Takamatsu et al. | 350/341 |
| 4,634,228 | 1/1987 | Iwasaki et al. | 350/341 |
| 4,759,614 | 7/1988 | Yokokura et al. | 350/341 |
| 4,879,059 | 11/1989 | Hanyu et al. | 350/340 |

OTHER PUBLICATIONS

Chemical Abstracts, vol. 99 No. 14, Oct. 3, 1983, p. 83, Abstract #106883x, Columbus, Ohio, US.
JP-A-58 017 (Toray Industries Inc.) Feb. 1, 1983.

*Primary Examiner*—William L. Sikes
*Assistant Examiner*—Anita Pellman Gross
*Attorney, Agent, or Firm*—Nixon & Vanderhye

[57] ABSTRACT

A liquid crystal display device comprising a pair of opposite transparent substrates, an orientation film provided on the facing side of each of said substrates via a transparent electrode, and ferroelectric liquid crystals capable of exhibiting a smectic phase sandwiched between said pair of substrates, said orientation film being made of a polyimide resin formed from bis(4-aminocyclohexyl) methane as a base component and an aromatic tetracarboxylic acid anhydride having one or two benzene rings as an acid component.

4 Claims, 3 Drawing Sheets

FERROELECTRIC LIQUID CRYSTAL DISPLAY DEVICE WITH POLYIMIDE ORIENTATION FILM OF BIS(4-AMINOCYCLOHEXYL) METHANE AND AROMATIC TETRACARBOXYLIC ACID ANHYDRIDE

BACKGROUND OF THE INVENTION

1. Field of the Invention

The present invention relates to a liquid crystal display device and, more particularly to an improved liquid crystal display device using chiral smectic C (SmC*) liquid crystals.

2. Description of the Related Art

Conventionally, a twisted nematic (TN) liquid crystal display device has been generally used as a display device utilizing liquid crystals. In the construction of such a device, a pair of electrode substrates each of which is formed with an orientation film thereon are disposed opposite to each other so as to render the orientation directions thereof crossing each other with a predetermined angle, whereby liquid crystals interposed between the electrode substrates are aligned twisted. In such a TN liquid crystal display device, however, its driving margin grows narrower as its multiplexing progresses, resulting in poor contrast. SBE (Supertwisted Birefrengence Effect) liquid crystal display element has developed as an improved type of the above display device. Although the contrast is improved, this improved display device still has disadvantages such as a limited viewing angle, a low response speed, and the like.

In 1980, Clark and Lagerwall proposed a display device using ferroelectric liquid crystals so as to solve the above problems involved in such conventional liquid crystal display devices using nematic liquid crystals [Appl. Phys. Lett., 36, 899 (1980)]. This liquid crystal display device is adapted to realize optical switching by changing the orientation direction of a liquid crystal molecule having optical anisotropy with a help of rotation caused when polarity of spontaneous polarization of a ferroelectric liquid crystal is to align with polarity of an electric field. One feature of this display device is bistability by virtue of which one optically stable state can be switched to the other or vice versa by applying a positive or negative electric field. Once an electric field is applied, display can be maintained even after removal of the electric field with the help of the bistability (memory effect). Another feature of the display device is that its switching speed is more than 1000 times as high as that of a TN liquid crystal display device. Utilizing this high switching speed characteristic and the above noted "memory effect" materializes high capacity display using matrix electrodes.

In manufacturing such a liquid crystal display device of nematic or ferroelectric type, liquid crystal molecules are required to be oriented in substantially parallel with the substrates and in one direction. Thus, in the conventional nematic liquid crystal display device, a polyimide film is typically used as an orientation film for the molecules which has been subjected to rubbing with cloth in one direction.

However, sufficient contrast cannot be obtained if the polyimide orientation film of the type used in the conventional TN liquid crystal display device is to be used in the display device using ferroelectric liquid crystals. For explaining this poor contrast, it is said that, in the display device proposed by Clark and Lagerwall, liquid crystal molecules having been considered to be oriented in one direction as shown in FIG. 4 are in fact not oriented in one direction, molecules near the upper substrate being oriented in different direction from those near the lower substrate as shown in FIG. 5, resulting in a twisted alignment of the molecules.

Orientation of the molecules is assumed to be mainly dependent of the nature of an orientation film contacting liquid crystals. Especially, such an orientation film as to attract strong or repel strong spontaneously polarized liquid crystal molecules tends to cause such a twisted alignment of the molecules. Therefore, to improve the liquid crystal display device in its contrast it is important to select an orientation film such as not to seriously affect the orientation of the spontaneously polarized liquid crystal molecules.

SUMMARY OF THE INVENTION

In view of the above circumstances, the inventor of this invention has conducted intensive research on a number of combinations of diamine and anhydrous carboxylic acid which are precursors of the polyimide of the orientation film. As a result, the inventor has found the fact that using a polyimide resin formed from a specific alicyclic diamine as a base component and a specific aromatic tetracarboxylic acid anhydride as an acid component for an orientation film make it possible to improve a display device in its contrast.

Accordingly, there is provided a liquid crystal display device comprising a pair of opposite transparent substrates, an orientation film provided on the facing side of each of said substrates via a transparent electrode, and ferroelectric liquid crystals capable of exhibiting a smectic phase sandwiched between said pair of substrates, said orientation film being made of a polyimide resin formed from bis(4-aminocylohexyl)methane as a base component and an aromatic tetracarboxylic acid anhydride having one or two benzene rings as an acid component.

DESCRIPTION OF THE PREFERRED EMBODIMENTS

Figure 1:
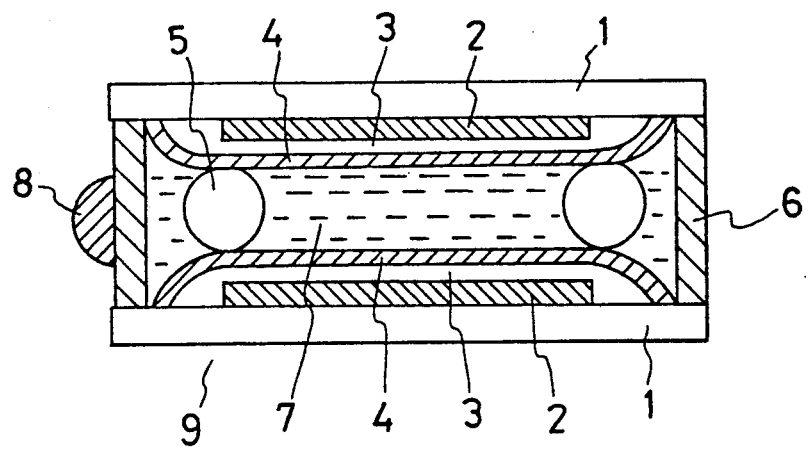
FIG. 1 is a sectional explanatory view of a construction of one example of a liquid crystal display device according to the invention.

The present invention utilizes ferroelectric liquid crystals capable of exhibiting a smectic phase. Various ferroelectric liquid crystals (liquid crystal composition) which are known in the art and can exhibit smectic C phase are suitably used in the liquid crystal device of this invention. Among them, preferable are those exhibiting smectic C phase at a temperature from −40° C. to 80° C. The polyimide film used as an orientation film in a display device of the invention is formed from bis (4-aminocylohexyl)methane as a base component and a aromatic tetracarboxylic acid anhydride having one or two benzene rings as an acid component. As the above aromatic tetracarboxylic acid, used is that of intramolecular dianhydride. Examples of such dianhydride having one benzene ring are that of benzene-1,2,4,5-tetracarboxylic acid (pyromellitic acid) and the like. In the case of dianhydride having two benzene rings, the two benzene rings may be directly bonded together or indirectly bonded via a predetermined group. The predetermined group may be a lower alkylene group, an ether group, a carbonyl group, or the like. The lower alkylene group is meant here by that having approximately 1–6 carbon atoms. Further, the two benzene rings may be combined to form another condensed ring (for example, naphthalene ring). Such dianhydride having two benzene rings may be selected from compounds having the following chemical structures. In addition, single or appropriately mixed aromatic anhydride recited above may be used as the above acid component.

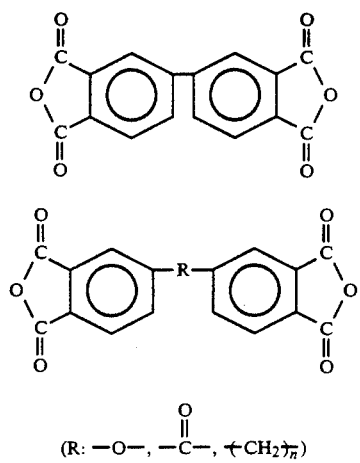

$(R: -O-, -\overset{O}{\underset{\parallel}{C}}-, +CH_2\overset{}{)_n})$ wherein n is 1 to 6.

In the present invention, the above orientation film is obtained by polycondensing the above base component and acid component to form a polyimide film and subsequently rubbing the surface thereof. The above polyimide film may be formed by applying a lower polycondensed product, e.g., a polyamic acid dissolved in a polar solvent such as dimethylacetamide (DMAC), γ-butyrolactone, N-methylpyrolidone, or the like to a transparent electrode-formed side of a predetermined transparent substrate by spin-coating, dipping, or the like, followed by baking. A temperature of baking is suitably approximately 200°–300° C., preferably 250° C.±50° C. The final film thickness is suitably approximately 50–2000 A, which can be adjusted by varying the amount of the polymer to be applied. If the film thickness is less than 50 A, the stability of molecules' orientation is lowered, and if it is more than 2000 A, uniform contrast cannot be obtained.

According to the present invention, the use of a polyimide film formed from bis(4-aminocyclohexyl)methane as a base component and an aromatic tetracarboxylic acid anhydride having one or two benzene rings as an acid component for an orientation film of a liquid crystal display device sandwiching ferroelectric liquid crystals of a smectic phase improves this display device in contrast.

Hereinafter, the present invention will be more fully described with reference to an example which is not intended to be limitative thereof.

EXAMPLE

FIG. 1 is an explanatory view of a construction of one example of a liquid display device according to the invention. Referring to FIG. 1, on one side of a transparent substrate 1 made of, for example, a float glass or a transparent plastic material (PMMA, PC etc.), is formed a transparent electrode 2 consisting of an ITO film. Laminated sequentially thereon are an electrode protective film 3 of $SiO_2$ or the like and an orientation film 4. Two transparent substrates thus obtained are disposed opposite to each other with their orientation films 4 facing each other, and bonded together via spacers 5 by means of epoxy resin to form a liquid crystal cell of, for example, 1.8 to 2 μm thick. Ferroelectric liquid crystals 7 of a smectic phase are injected into this cell with vacuum injection. Thereafter, an injection hole of the cell is sealed with a UV setting resin 8 to form a liquid crystal display device 9. Ferroelectric liquid crystals exhibiting chiral smectic C (SmC*) phase are preferably used as the ferroelectric liquid crystals 7 of a smectic phase. In this example, used was CS1014 (a product of CHISSO CORPORATION).

A polyimide film formed from bis(4-aminocyclohexyl) methane represented by the following formula B as a base component and an aromatic tetracarboxyl acid dianhydride represented by the following formula A-1, A-2, A-3, A-4, or A-5 as an acid component was used as the above orientation film 4.

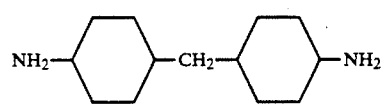
(B)

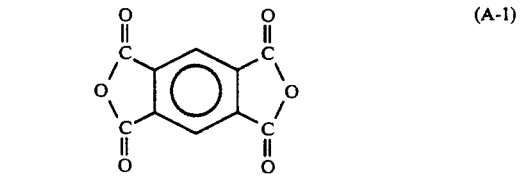
(A-1)

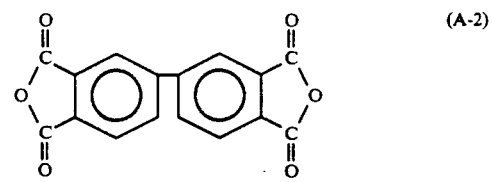
(A-2)

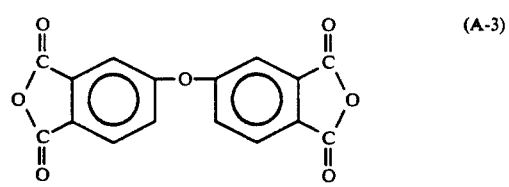
(A-3)

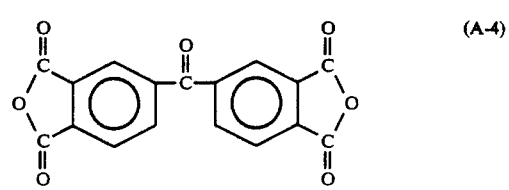
(A-4)

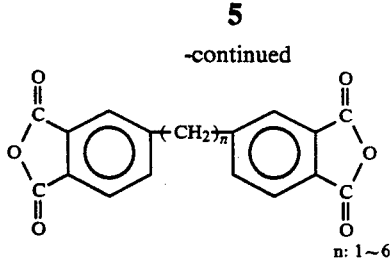

(A-5)

n: 1~6

The above di-4-aminocyclohexylmethane B and individual tetracarboxyl acid dianhydride A-1, A-2, A-3, A-4, and A-5 were subjected to polycondensation reactions respectively in a solvent at 250° C. for 2 hrs. to yield five sorts of polycondensed product. Each product was then diluted with N-methylpyrrolidone solvent to prepare a coating solution having polymer content of 7 wt %.

Subsequently, each electrode-formed side of the pair of substrates was coated with the above coating solution by spin-coating method, followed by baking at 250° C. for one hour to form a polyimide film of 50-1000 A thick. Thereafter, the polyimide film thus obtained was rubbed in one direction to obtain the orientation film 4. The pair of substrates were disposed so that one rubbing (orientating) direction was antiparallel to the other.

Figure 2:
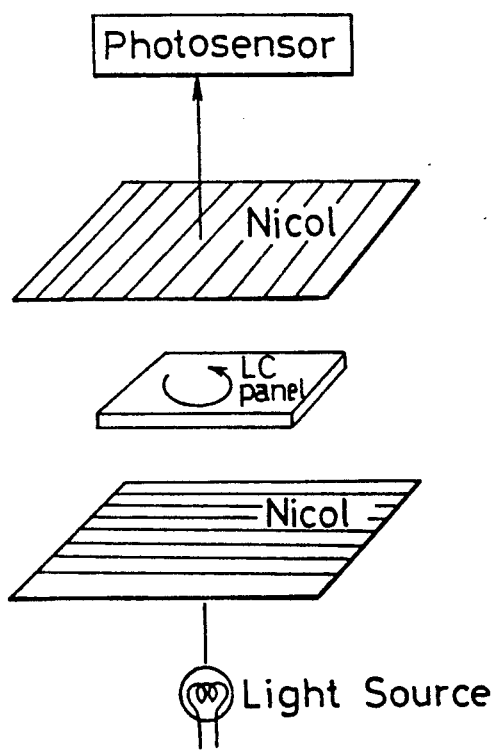
FIG. 2 is a view illustrating a system for measuring optical property of the liquid crystal display device shown in FIG. 1.
Figure 3:
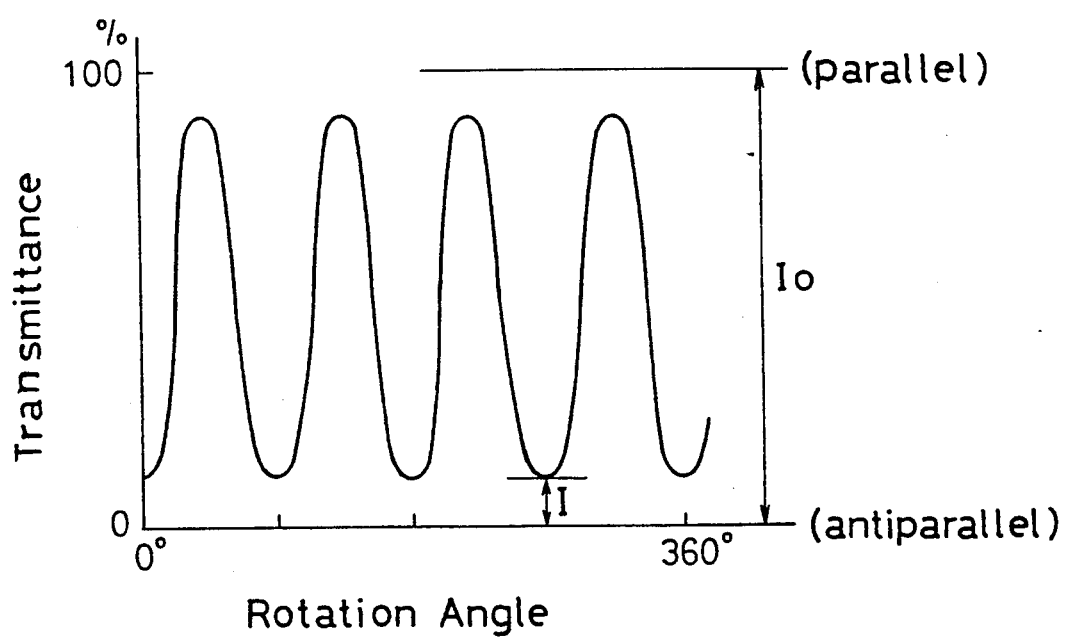
FIG. 3 is a graph showing a light-intensity variation measured on the basis of the system shown in FIG. 2.
Figure 4:
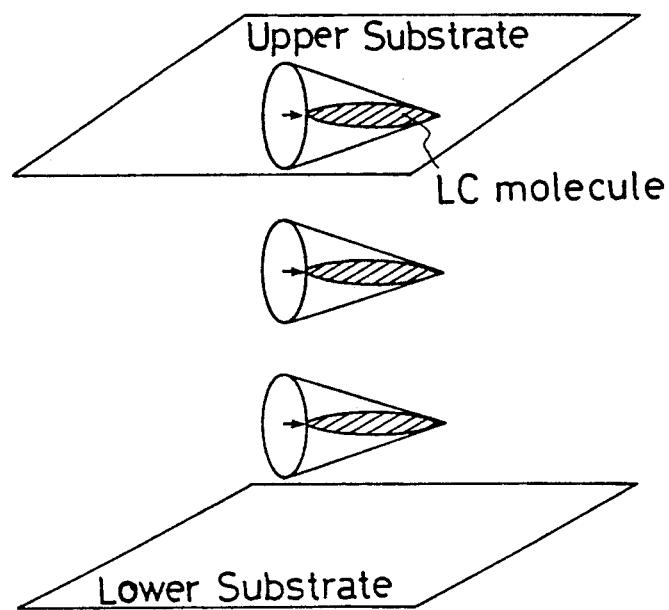
FIG. 4 is an explanatory view showing an state of ferroelectric liquid crystals in uniaxial alignment.
Figure 5:
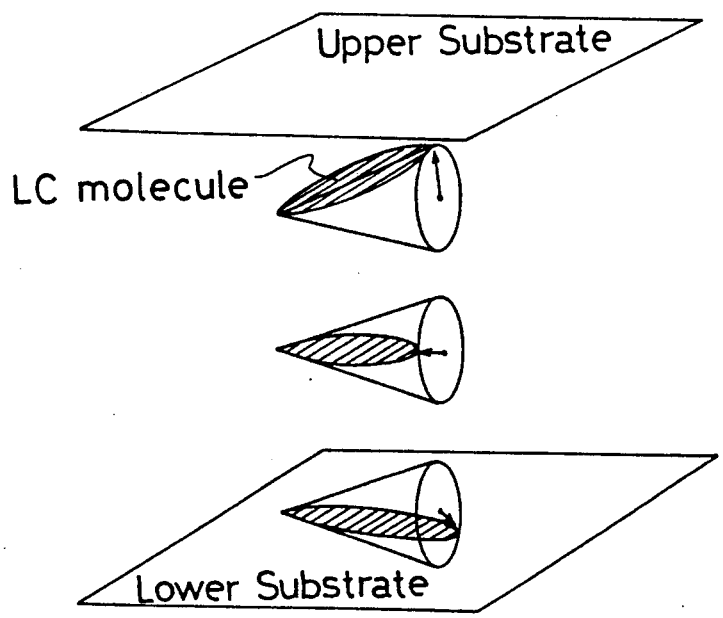
FIG. 5 is an explanatory view showing an state of ferroelectric liquid crystals in twisted alignment.

Measurement was performed with respect to the optical property of the liquid crystal display device (hereinafter termed as LC panel) 9 having each of orientation films thus obtained. As shown in FIG. 2, the LC panel was interposed between orthogonally disposed Nicols, and rotated in the direction designated by the arrow. As the LC panel rotated, intensity of transmitting light varied, and the lowest intensity was measured. A ratio $I/I_o$ of the lowest intensity I of transmitting light to the intensity $I_o$ of projecting light (I and $I_o$ are indicated in FIG. 3) was then found. Measurement was also performed with respect to the optical property of a comparative example having the same construction as the above display device except that POLYIMIDE PIQ (a product of Hitachi Chemical Co., Ltd.) which had been used as a typical orientation film for a conventional TN liquid crystal display device was used instead of the above orientation film. Results of these measurements are shown in Table 1.

TABLE 1

| Base Component | Acid Component | $I/I_o$ |
| --- | --- | --- |
| B | A-1 | 1% or less |
|  | A-2 | 1% or less |
|  | A-3 | 1% or less |
|  | A-4 | 1% or less |
|  | A-5 | 1% or less |
| Comparative Example |  | 13% |

As can be understood from Table 1, with respect to the above liquid crystal display devices using respective specific orientation films, ratios ($I/I_o$) of transmitting light are all 1% or less, while it is 13% with respect to the display device using a conventional orientation film. This proves that the display device of the present invention has a significant light-transmitting inhibitive feature offering a higher contrast of display.

Accordingly, the present invention can provide a liquid crystal display device using ferroelectric liquid crystals of a smectic phase which is significantly improved in its contrast.

What is claimed is:

1. A liquid crystal display device, comprising:
   a pair of opposite transparent substrates;
   an orientation film provided on the facing side of each of said substrates over a transparent electrode, said orientation film having a rubbed surface in one direction;
   ferroelectric liquid crystals capable of exhibiting a smectic phase sandwiched between said pair of substrates, said orientation film being made of a polyimide resin formed from bis(4-aminocyclohexyl) methane as a base component and an aromatic tetracarboxylic acid anhydride selected from the group consisting of pyromellitic acid dianhydride and a compound of the formula:

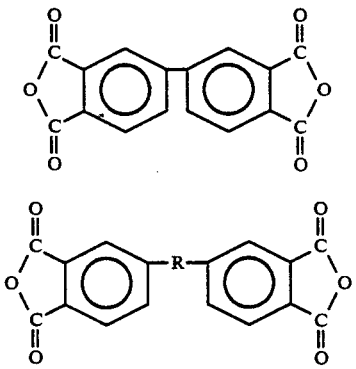

wherein R is —O—, —CO— or —($CH_2$)—$_n$, wherein n is 1 to 6.

2. The device of claim 1 in which the orientation film is 50-2000 A in thickness.

3. The device of claim 1, in which the transparent electrode is covered with a protective film.

4. The device of claim 1, in which the pair of transparent substrates is disposed so that orientation directions of the orientation films formed on the substrates are antiparallel to each other.

* * * * *